United States Patent
Kanatzidis et al.

(10) Patent No.: US 12,372,668 B2
(45) Date of Patent: Jul. 29, 2025

(54) LITHIUM-CONTAINING THIOSTANNATE SPINELS FOR THERMAL NEUTRON AND ALPHA-PARTICLE DETECTION

(71) Applicant: Northwestern University, Evanston, IL (US)

(72) Inventors: Mercouri G. Kanatzidis, Wilmette, IL (US); Michael Anthony Quintero, Evanston, IL (US)

(73) Assignee: Northwestern University, Evanston, IL (US)

( * ) Notice: Subject to any disclaimer, the term of this patent is extended or adjusted under 35 U.S.C. 154(b) by 186 days.

(21) Appl. No.: 18/272,852

(22) PCT Filed: Feb. 25, 2022

(86) PCT No.: PCT/US2022/070830
§ 371 (c)(1),
(2) Date: Jul. 18, 2023

(87) PCT Pub. No.: WO2022/183206
PCT Pub. Date: Sep. 1, 2022

(65) Prior Publication Data
US 2024/0103186 A1    Mar. 28, 2024

Related U.S. Application Data

(60) Provisional application No. 63/153,444, filed on Feb. 25, 2021.

(51) Int. Cl.
*G01T 3/00*    (2006.01)
*C01G 19/00*   (2006.01)
(Continued)

(52) U.S. Cl.
CPC .......... *G01T 1/1606* (2013.01); *C01G 19/006* (2013.01); *C01G 45/22* (2025.01);
(Continued)

(58) Field of Classification Search
CPC ........ C01G 30/00; C01G 30/002; B01J 39/02; B01J 39/09; C02F 1/42; C02F 1/281;
(Continued)

(56) References Cited

U.S. PATENT DOCUMENTS

| | | |
|---|---|---|
| 7,034,307 B2 | 4/2006 | Sane et al. |
| 8,519,347 B2 | 8/2013 | Kanatzidis et al. |

(Continued)

FOREIGN PATENT DOCUMENTS

| | | |
|---|---|---|
| CN | 110710045 A | 1/2020 |
| EP | 3203556 B1 | 8/2017 |
| WO | WO 2006/085307 A1 | 8/2006 |

OTHER PUBLICATIONS

The International Search Report and the Written Opinion issued on Jul. 13, 2022 for international patent application No. PCT/US22/70830; pp. 1-7.

(Continued)

*Primary Examiner* — David P Porta
*Assistant Examiner* — Fani Polyzos Boosalis
(74) *Attorney, Agent, or Firm* — Bell & Manning, LLC (57) ABSTRACT

Lithium-containing thiostannate spinel compounds having the formula $Li_2M_{1+x}Sn_{3-x}S_8$, where x is 0 or 1 and M is Mg, Fe, Mn, Ni, Ga, In, or a combination thereof; or the formula $Li_{1.66}CuSn_{3.33}S_8$ are provided. Methods and devices for detecting incident neutrons and alpha-particles using the compounds are also provided. For thermal neutron detection applications, the compounds can be enriched with lithium-6 isotope ($^6Li$) to enhance their neutron detecting capabilities.

20 Claims, 6 Drawing Sheets

(51) Int. Cl.
    *C01G 45/22*    (2025.01)
    *C01G 53/82*    (2025.01)
    *G01T 1/16*    (2006.01)

(52) U.S. Cl.
    CPC .............. *C01G 53/82* (2025.01); *G01T 3/00* (2013.01); *C01P 2002/32* (2013.01); *C01P 2002/60* (2013.01); *C01P 2002/76* (2013.01); *C01P 2002/77* (2013.01); *C01P 2006/60* (2013.01)

(58) Field of Classification Search
    CPC ............ C02F 2001/425; C01P 2006/16; C01P 2002/84; C01P 2006/12; C01P 2004/03; C01P 2002/85; C01P 2004/82; C01P 2002/82; C01P 2002/72
    See application file for complete search history.

(56) References Cited

U.S. PATENT DOCUMENTS

| | | | |
|---|---|---|---|
| 9,334,581 B2 | 5/2016 | Stowe et al. | |
| 9,632,190 B2 | 4/2017 | Stowe et al. | |
| 10,472,249 B2* | 11/2019 | Kanatzidis | .............. B01J 39/09 |
| 2010/0292065 A1 | 11/2010 | Kanatzidis et al. | |
| 2018/0164447 A1 | 6/2018 | Kanatzidis et al. | |
| 2018/0323469 A1 | 11/2018 | Lim et al. | |
| 2021/0206638 A1 | 7/2021 | Kanatzidis et al. | |
| 2023/0294993 A1 | 9/2023 | Kanatzidis et al. | |

OTHER PUBLICATIONS

Saneyuki Ohno et al., Pre-Publication of the article: "Further evidence for energy landscape flattening in the superionic argyrodites Li6+xP1-xMxS5I (M=Si, Ge, Sn)," *ChemRxiv.*, (Publicly available on or before Jul. 6, 2019). DOI:10.26434/chemrxiv.8109506.

Daniel G. Chica et al., Pre-Publication of the article: "Direct Thermal Neutron Detection by the 2D Semiconductor 6LiInP2Se6," *Nature* Jan. 15, 2020, pp. 1-34. (Publicly available on or before Jan. 15, 2020).

Kuibo Yin et al., "Self-Assembled Framework Formed During Lithiation of SnS2 Nanoplates Revealed by in Situ Electron Microscopy," *Acc. Chem. Res.* Jul. 6, 2017; pp. 1-8.

Mercouri G. Kanatzidis, "New directions in synthetic solid state chemistry: chalcophosphate salt fluxes for discovery of new multinary solids," *Current Opinion in Solid State & Materials Science* 1997, 2:139-149.

Jennifer A. Aitken et al., "LiEuPSe4 and KEuPSe4: Novel Selenophosphates with the Tetrahedral [PSe4]3-Building Block," *Inorg. Chem.* 2000, 39, 1525-1533.

Yuanyuan Zhou et al., "Doping and alloying for improved perovskite solar cells," *J. Mater. Chem. A*, 2016, 4, 17623.

Mo et al., "First Principles Study of the Li10GeP2S12 Lithium Super Ionic Conductor Material," *Chemistry of Materials* (Jan. 10, 2012), 24, No. 1: 15-17.

Indika U. Arachchige et al., "Mercouri G. Kanatzidis: Excellence and Innovations in Inorganic and Solid-State Chemistry," *Inorg. Chem.* 2017, vol. 56; pp. 7582-7597.

A Maity et al., "Hexagonal Boron nitride neutron detectors with high detection efficiencies," *Journal of Applied Physics* 123, pp. 044501-01-044501-8 (2018).

E. Tupitsyn et al., "Lithium containing chalcogenide single crystals for neutron detection," *Journal of Crystal Growth* 393 (2014), pp. 23-27.

* cited by examiner

LITHIUM-CONTAINING THIOSTANNATE SPINELS FOR THERMAL NEUTRON AND ALPHA-PARTICLE DETECTION

CROSS-REFERENCE TO RELATED APPLICATIONS

The present application is a National Stage of International Application No. PCT/US22/70830, filed Feb. 25, 2022, which claims priority to U.S. provisional patent Application No. 63/153,444 that was filed Feb. 25, 2021, the entire contents of both of which are incorporated herein by reference.

REFERENCE TO GOVERNMENT RIGHTS

This invention was made with government support under DMR-2003476 awarded by the National Science Foundation. The government has certain rights in the invention.

BACKGROUND

The spinel family of compounds is well known for both the diversity of properties observed in them and the wide range of compositions that are stable in this structure type. The general formula for this family of cubic compounds is $AB_2X_4$, and they crystallize in the space group Fd-3m. In this structure, the A atom is tetrahedrally coordinated by four X atoms and sits in channels created by edge-sharing $BX_6$ octahedra. The A and B site cations can be transition metals or main group metals and the X anions can be $O^{2-}$, chalcogen anions, halides, or more complex anions, such as $CN^-$. When X is a chalcogen (S, Se, or Te), the compounds form a subclass known as chalcospinels. These have applications as potential thermoelectric materials, battery cathodes, and platforms for studying aspects of condensed matter physics. There are also several families of lithium chalcogenides including argyrodites and thio-lithium superionic conductors (thio-LISICONs). However, their numbers are, in general, relatively limited.

SUMMARY

Lithium-containing thiostannate compounds having a 3D spinel structure for use as active materials in neutron and/or alpha-particle detectors are provided. Also provided are neutron and alpha-particle detectors incorporating the lithium-containing thiostannate compounds and methods for detecting incident neutrons and alpha-particles using the compounds.

The lithium-containing thiostannate compounds have a three-dimensional cubic spinel structure and the formula: $Li_2M_{1+x}Sn_{3-x}S_8$, where $0 \leq x \leq 1$ and M is Mg, Fe, Mn, Ni, Ga, In or a combination thereof, or the formula $Li_{1.66}CuSn_{3.33}S_8$. In some illustrative embodiments, x is zero or one.

One embodiment of a neutron or alpha-particle detector that incorporates a lithium-containing thiostannate as an active material includes: a material comprising a lithium-containing thiostannate compound having a three-dimensional cubic spinel structure and the formula: $Li_2M_{1+x}Sn_{3-x}S_8$, where x is 0 or 1 and M is Mg, Fe, Mn, Ni, Ga, In or a combination thereof; or the formula $Li_{1.66}CuSn_{3.33}S_8$; a first electrode in electrical communication with the material; and a second electrode in electrical communication with the material, wherein the first and second electrodes are configured to apply an electric field across the material.

One embodiment of a method for detecting neutrons or alpha particles includes the steps of: applying an electric field across a lithium-containing thiostannate compound having a three-dimensional cubic spinel structure and the formula: $Li_2M_{1+x}Sn_{3-x}S_8$, where x is 0 or 1 and M is Mg, Fe, Mn, Ni, Ga, In or a combination thereof, or the formula $Li_{1.66}CuSn_{3.33}S_8$; exposing the lithium-containing thiostannate compound to incident neutrons or alpha particles, wherein the lithium-containing thiostannate compound absorbs incident neutrons or alpha particles, resulting in the generation of an electrical signal; and detecting the electrical signal.

BRIEF DESCRIPTION OF THE DRAWINGS

Illustrative embodiments of the invention will hereafter be described with reference to the accompanying drawings, wherein like numerals denote like elements.

DETAILED DESCRIPTION

Lithium-containing thiostannate spinel compounds having the formula $Li_2M_{1+x}Sn_{3-x}S_8$, where x is 0 or 1 and M is Mg, Fe, Mn, Ni, Ga, In, or a combination thereof; or the formula $Li_{1.66}CuSn_{3.33}S_8$ are provided. Methods and devices for detecting incident neutrons and alpha-particles using the compounds having high resistivities are also provided.

The presence of lithium as a charge-balancing anion in the compound framework results in the adoption of a three-dimensional (3D) cubic spinel structure. As such, the lithium-containing thiostannate spinel compounds are readily distinguishable from transition metal thiostannate compounds of the formula $A_x[M_xSn_{3-x}S_6]$ that are charge-balanced by the larger alkali metal anions $Na^+$ to $Sn^+$, which adopt a two-dimensional (2D) layered structure and are commonly referred to as the KMS compounds.

The physical properties of the lithium-containing thiostannate spinel compounds can be tuned by changing their composition, as illustrated in the Example. For example, by tuning the identity of the transition metal in the structure, the optical band gaps and electrical resistivities of the materials can be varied.

For thermal neutron detection applications, the compounds may be isotopically enriched with a lithium-6 isotope to enhance their neutron detecting capabilities. As used herein, isotopically enriched means that the relative abundance of at least one isotope of the element has been enriched relative to the natural abundance of that isotope in that element. Lithium that is isotopically enriched with lithium-6 is designated $^6$Li. Some embodiments of the lithium-containing thiostannate spinels are made using a combination of lithium having a natural isotopic abundance and isotopically enriched lithium.

Some embodiments of the lithium-containing thiostannate spinels are doped with extrinsic dopants to increase their carrier transport properties and enhance their performance as detector materials. Extrinsic dopants include F, Cl, Br, I, Se, Te, As, Sb, Si, Ge, Pb, Al, Ti, Zn, Cd, Hg, Ag, and Na. As used herein, the term doping refers to the intentional addition of small amounts of an 'impurity' element that does not change the crystal structure of the compound or introducing a new phase. By way of illustration, a dopant atom can substitute for a small fraction of the M atoms in the $Li_2MSn_3S_8$ lattice or the Cu in the $Li_{1.66}CuSn_{3.33}S_8$ lattice without changing the crystal structure of the material, or a dopant element can substitute for a small number of the lithium atoms in the $Li_2MSn_3S_8$ lattice or the $Li_{1.66}CuSn_{3.33}S_8$ lattice without changing the crystal structure of the material or introducing a new phase.

Crystalline, including single-crystal, detector-grade materials comprising the compounds, can be grown with high chemical purity and high crystal quality. The crystals can be grown via slow solidification from a melt comprising stoichiometric quantities of the elements making up the compounds. Phase-pure powders of the compounds can also be made by heating a pressed pellet comprising stoichiometric quantities of the elements making up the compounds, followed by a cooling and grinding.

The lithium-containing thiostannate spinels have high electrical resistivities. For example, the lithium-containing thiostannate spinels can have electrical resistivities at 23° C. of at least $1 \times 10^5$ Ω·cm, including electrical resistivities of at least $1 \times 10^6$ Ω·cm, and further including electrical resistivities of at least $1 \times 10^7$ Ω·cm. By way of illustration, the lithium-containing thiostannate spinels can have resistivities at 23° C. in the range from $1 \times 10^6$ Ω·cm to $3 \times 10^7$ Ω·cm. Methods of determining the electrical resistivity of a material are described in the Example. The very high resistivity of the compounds enables the use of large area detectors and high applied voltages, allowing for increased efficiency and gamma ray discrimination. In addition, the use of relatively low atomic number (Z) elements in the compounds decreases the chance of gamma ray absorption, which can lead to false counts during signal detection.

The lithium-containing thiostannate spinels are semiconductors, some embodiments of which have optical bandgaps in the range from 0.8 eV to 2.5 eV, including in the range from 0.9 eV to 2.2 eV.

One aspect of the invention provides direct-conversion solid state neutron detectors. In some embodiments, the neutron detectors include: a material comprising a lithium-containing thiostannate spinel of a type described herein; a first electrode in electrical communication with the material; a second electrode in electrical communication with the material, wherein the first and second electrodes are configured to apply an electric field across the material; and a detector configured to measure an electrical signal generated by electrons and/or holes (e.g., electron-hole pairs) that are formed when the material is exposed to incident thermal neutrons. In these neutron detectors, the lithium in the lithium-containing thiostannate spinel compounds absorbs incident neutrons, generating highly energetic charged particles (e.g., alpha-particles) that deposit their energies in the material, creating the electrons and holes which give rise to the electrical signal when an electric field is applied across the material.

The lithium-containing thiostannate spinels also can be used for direct alpha-particle detection. One embodiment of an alpha-particle detector includes: a material comprising a lithium-containing thiostannate spinel of a type described herein; a first electrode in electrical communication with the material; a second electrode in electrical communication with the material, wherein the first and second electrodes are configured to apply an electric field across the material; and a detector configured to measure a signal generated by electrons and/or holes (e.g., electron-hole pairs) that are formed when the material is exposed to incident alpha-particles.

In the detectors, the electrodes can comprise a metal, for example, Au, Pt, Pd, In, Ni, and/or Ti, or a combination of two or more thereof. Suitable electrodes include, but are not limited to, planar symmetrical type electrodes and planar unsymmetrical type electrodes, which can be used with flat single-crystals of the lithium-containing thiostannate spinels to fabricate planar detectors.

Arrays comprising a plurality of the detectors on a substrate can be provided to form a detector array. Because single-crystals of the compounds can grow in uniform single-crystal plates, they are well suited for use in pixel arrays, which allow for the spatially resolved neutron detection needed in neutron imaging applications. The neutron detectors and arrays of the neutron detectors may further include electronics operable for measuring the electrical signal from the detectors and for generating spatially and/or time-resolved images of the neutrons incident upon the detector crystals. Similarly, the alpha-particle detectors and arrays of the alpha-particle detectors may further include electronics operable for measuring the electrical signal from the detectors and for generating spatially and/or time-resolved images of the alpha-particles incident upon the detector crystals.

Figure 1:
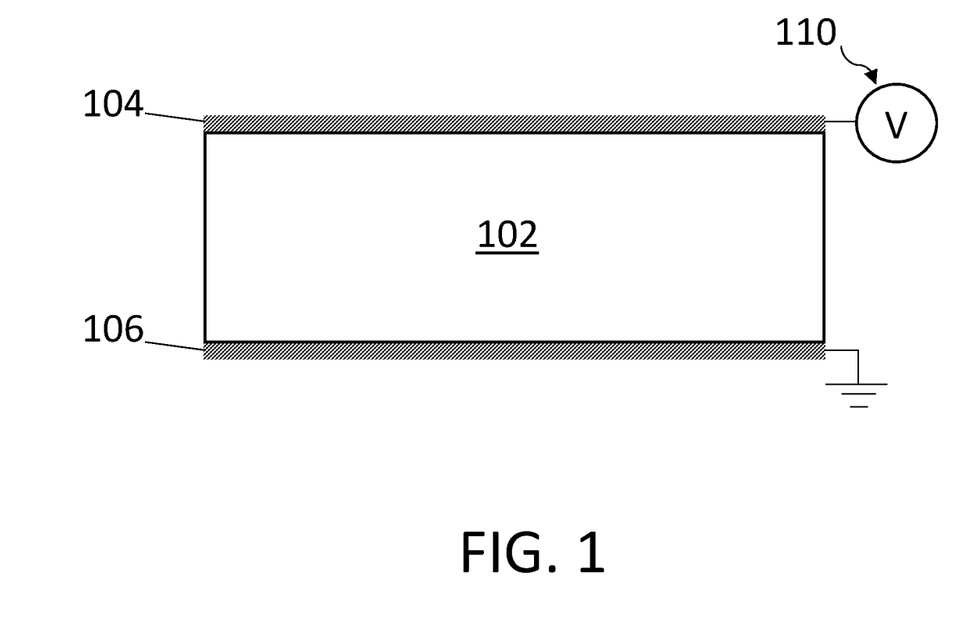
FIG. 1 is a schematic diagram of a neutron detector and/or alpha-particle detector.

An illustrative embodiment of a neutron or alpha-particle detector is shown in FIG. 1. As shown in the figure, the detector includes a layer of lithium-containing thiostannate spinel 102 sandwiched between a pair of electrodes 104, 106, at least one of which is substantially transparent to incident thermal neutrons and/or alpha-particles. Electrodes 104, 106 are connected to a power source 110 that applies a voltage across lithium-containing thiostannate spinel 102. One of the electrodes may be a continuous electrode and the other electrode may be part of an electrode array that defines a pixelated detector. The electrodes are coupled to a readout circuit that includes readout elements (e.g., thin film transistors, charge coupled devices, and/or C-MOS semiconductor chips) for detecting signals from charge carriers generated when a neutron or alpha particle interacts with lithium-containing thiostannate spinel 102. An imaging system, including a data processor for processing signals from the readout circuit, and a display for displaying images of a neutron-emitting or alpha-particle-emitting object being imaged by the detector, may be coupled to the readout circuit for performing image processing and display.

Unless otherwise indicated herein, the values for measured or measurable quantities refer to the value of those quantities at room temperature (23° C.) and pressure (1 atm).

EXAMPLE

This example demonstrates the differences in the structural dimensionality and properties of 3D cubic spinel thiostannate compounds made with charge-balancing lithium cations and layered 2D KMS-family thiostannate compounds ($A_x[M_xSn_{3-x}S_6]$) (M=Mn, Mg, In etc; A=Na, K, Rb, Cs) made with larger charge-balancing alkali metal cations.

All known members of the KMS-family of compounds are layered with no apparent size effect on the dimensionality of the covalent $[M_xSn_{3-x}S_6]^{x-}$ framework as the alkali metal atom (A) increases from $Na^+$ to $Cs^+$. However, as demonstrated by the present inventors, when the smallest alkali metal, the lithium ion, is used in the corresponding compositions, a striking change is observed; the dimensionality of the framework converts to a three-dimensional (3D) motif of the spinel structure type.

Herein, the synthesis process, crystal structure, and properties of six lithium thiostannates with the formulas $Li_{1.66}CuSn_{3.33}S_8$ and $Li_2MSn_3S_8$ (M=Mg, Fe, Mn, Ni, Co) are described. They all exhibited 3D cubic spinel structures in contrast to the 2D structures adopted by the $A_x[M_xSn_{3-x}S_6]$ compounds. The $Li_2MSn_3S_8$ structure (M=Mg, Fe, Mn, Ni, Co) exhibited mixed site occupancy disorder at the octahedral sites between M and Sn. $Li_{1.66}CuSn_{3.33}S_8$ also exhibited occupational disorder at the tetrahedral sites between Li and Cu as well as at the octahedral sites between Li and Sn. Across the different elements, electrical resistivities ranged between $2.8 \times 10^3$ Ω·cm for Fe and $2.2 \times 10^7$ Ω·cm for the Mg analog, and the optical band gaps ranged between 0.91 (2) eV and 2.19 (2) eV. Density functional theory (DFT) calculations predicted that both $Li_2MgSn_3S_8$ and $Li_{1.66}CuSn_{3.33}S_8$ have indirect gaps as well as high energy dispersity in their conduction band widths with small electron carrier effective masses.

Experimental Methods

The synthetic procedures for all compounds differed only in the identities and amounts used for all reagents but were otherwise identical. As such, the general synthesis used to prepare both crystals and powder for each compound are described, and the reagents and amounts used are provided in the Supplemental Information at the end of this Example.

Reagents and Synthesis: All starting elements were used as obtained: Sn powder (99.999% American Elements, Los Angeles, CA), sulfur buttons S (99.99%, 5N Plus Inc., Saint-Laurent, Quebec, Canada), Li sticks (99.9% Sigma-Aldrich), Mn—325 mesh powder (99% Sigma-Aldrich), Fe powder spherical <10 micron (99.9% Alfa Aesar), Mg powder (99% Sigma-Aldrich), V powder—100 mesh (99.9% Sigma Aldrich), Ni powder <50 micron (99.7% Sigma-Aldrich), Co powder 2 micron (99.8% Sigma-Aldrich), Cu powder—100 mesh (99% Alfa Aesar). $Li_2S$ was prepared using condensed ammonia as reported previously. (Khoury, J. F. et al., *Inorganic chemistry* 2018, 57, (4), 2260-2268.)

Single Crystal Synthesis of $Li_2MSn_3S_8$ (M=Co, Mg, Fe, Mn, Ni) and $Li_{1.66}CuSn_{3.33}S_8$.

Single crystals of $Li_2MgSn_3S_8$ were prepared as follows: stoichiometric amounts of Sn powder, Mg powder, S buttons, and $Li_2S$ powder were combined in a nitrogen double glovebox and ground in an agate mortar and pestle. The powder was then added to a glassy carbon crucible and loaded into a fused silica tube with an inner diameter of 16 mm and an outer diameter of 18 mm. The tube was then evacuated to a pressure of $\sim 4 \times 10^{-3}$ mbar and flame sealed with a tube of length ~5 inches. The sealed tube was placed into a vertical tube furnace and heated to 900° C. at a rate of 50° C./h, soaked for 6 h, after which the furnace was turned off, and the tube was cooled to room temperature. The synthesis yielded octahedral shaped crystals for all compounds with ~70-80% yields. For $Li_2MgSn_3S_8$ and $Li_{1.66}CuSn_{3.33}S_8$, the crystals appeared red and dark red respectively; the color for all other compounds was black.

The phase pure powder was prepared as follows: Stoichiometric amounts of Sn powder, Mg powder, S buttons, and $Li_2S$ powder were combined in a double glovebox filled with nitrogen and ground in an agate mortar and pestle. The homogenized powder was then loaded into a stainless-steel die and pressed into a 6 mm pellet utilizing a vise to apply the force. The pressed pellet was then placed into a glassy carbon crucible, which was then placed into a fused silica tube of outer diameter of 18 mm and inner diameter of 16 mm. Note, because glassy carbon is inert towards reactions with Li, stoichiometries were utilized in ratios identical to the target compounds. Should other non-inert containers be used, care should be taken in adding extra Li to compensate for parasitic side reactions. The fused silica tube, containing the pellet and crucible, was evacuated to $\sim 4 \times 10^{-3}$ mbar and flame sealed so that the final length of the tube was ~5 inches. The sealed tube was then loaded into a vertical tube furnace such that the top of the tube was below the middle of the furnace and the tip of the thermocouple was at the same depth as the crucible. The tube was then heated to 600° C. at a rate of 50° C./h, soaked at 600° C. for 8 h, and then cooled to room temperature by turning the furnace off. After heating, the pellet had noticeably increased to ~2-3× in size and decreased in density. The sealed tube was then placed in a double glovebox filled with nitrogen, the tube opened, and the pellet ground in an agate mortar and pestle. The reground powder was then pressed into a 6 mm pellet and placed into the same glassy carbon crucible. The crucible was then loaded into a fused silica tube of outer diameter of 18 mm and inner diameter of 16 mm, evacuated to $\sim 4 \times 10^{-3}$ mbar, and flame sealed. The sealed tube was then placed in a vertical tube furnace, heated to 600° C. at a rate of 100° C., and soaked at 600° C. for 8 h, after which the furnace was turned off and the tube was cooled to room temperature. For $Li_2MgSn_3S_8$, the synthesized powder was a mustard yellow color after grinding; for all other compounds, the powder appeared black.

Density Functional Theory (DFT)

DFT calculations were performed for the relaxed structures and total energies within the framework of the generalized gradient approximation (GGA) of Perdew-Burke-Ernzerhof. The projector augmented wave potentials were used for the exchange correlation functional. (Perdew, J. P. et al., *Physical review letters* 1996, 77, (18), 3865.) The periodic boundary conditions and plane wave basis sets were applied as implemented in the Vienna ab initio simulation package. (Kresse, G. et al., *Physical review B* 1996, 54, (16), 11169.) The cutoff energy was set to 500 eV for the plane wave basis set. A very dense k-mesh was used, corresponding to 4000 k-points per reciprocal atom in the Brillouin zone and a small energy convergence of approximately 3 meV/cation guarantee calculation accuracy. For $Li_2MgSn_3S_8$ with experimentally determined mixed occupancy at an individual site, the lowest energy configuration from many geometrically distinct Sn/Mg configuration possibilities was first identified and then band structure calculations were performed for the most favorable configuration. Simply speaking, all structural possibilities within a 56-atom cell were enumerated and their electrostatic energies were ranked. For the five structures with the lowest electrostatic energies, further DFT calculations were performed to determine the most favorable (lowest energy) structure, and band structure calculations were performed. For structures with fully occupied single-atom sites, extra procedures related to partial occupancy were not necessary to perform. Coordinates for the optimized structures used for calculations are provided in the Supplemental Information.

Electrical Conductivity and Impedance Spectroscopy

Samples were prepared for transport measurements by pressing the ground powders into pellets using a 6 mm cylindrical die and applying a force of 1 metric ton. The pellets were placed into glassy carbon crucibles, which were then flame sealed in an evacuated silica tube. The sealed tubes were annealed at 500° C. for 4 h and then cooled to room temperature before opening. Pellets for electrical conductivity measurements were prepared by applying colloidal carbon paste to each face of the pellet and attaching copper wire leads to the sides.

Ionic conductivity was determined by alternating current (AC) impedance spectroscopy using a Gamry Analyzer Reference 600+. Indium foils were pressed onto the surfaces of the pellets to serve as blocking electrodes, and the pellets were placed in a custom-built cylindrical cell. Impedance measurements were conducted at room temperature (~21° C.) over a frequency range of 5 MHz to 1 Hz with an applied voltage of 10 mV.

Results and Discussion
Synthesis and Crystal Structures

Generally, solid-state reactions involve powders of starting materials, grinding them together, and heating the mixtures to high temperatures for extended periods of time to reach a pure compound, often in an iterative manner. When this reaction route does not proceed through a molten state, it becomes diffusion-limited, and as such, it is typical for reaction times to extend to several hours, or even several days. The synthetic procedures used to prepare the compounds reported herein involve direct solid-state reactions but are relatively quick, as all compounds can be prepared in little more than a day.

Figure 2A:
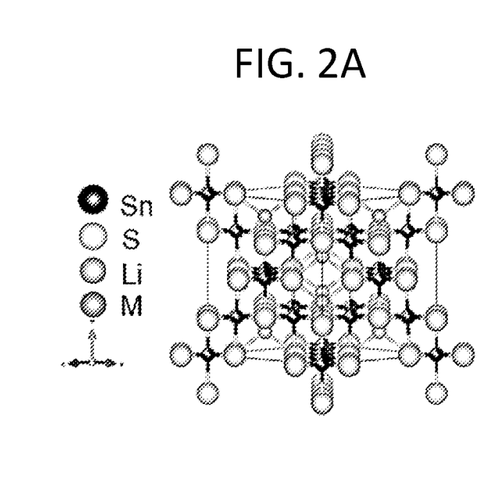
FIGS. 2A-2D show a crystal structure viewed along the (FIG. 2A) [110], (FIG. 2B) [111], and (FIG. 2C) [001] directions of $Li_2MSn_3S_8$ (M=Mg, Fe, Mn, Ni, Co,) and the (FIG. 2D) [110] direction of $Li_{1.66}CuSn_{3.33}S_8$.
Figure 2B:
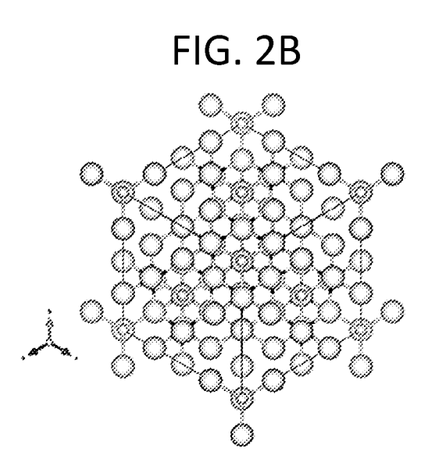
Figure 2C:
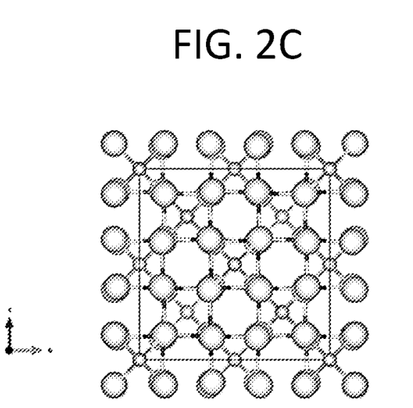
Figure 2D:
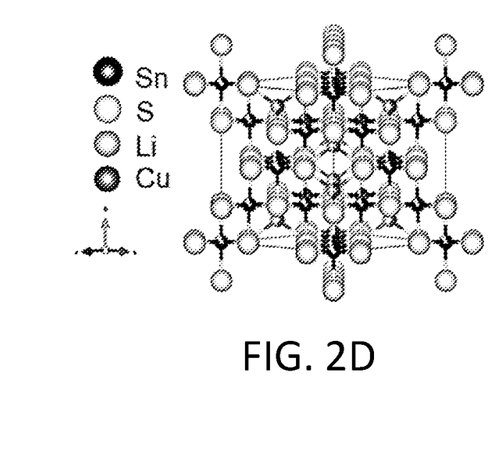
Figure 2E:
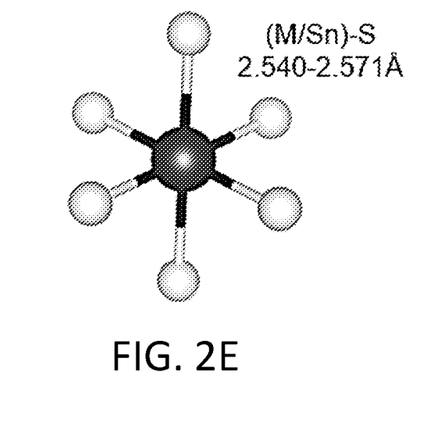
FIGS. 2E-2F show local coordination of (FIG. 2E) M/Sn atoms to sulfur and (FIG. 2F) lithium to sulfur.
Figure 2F:
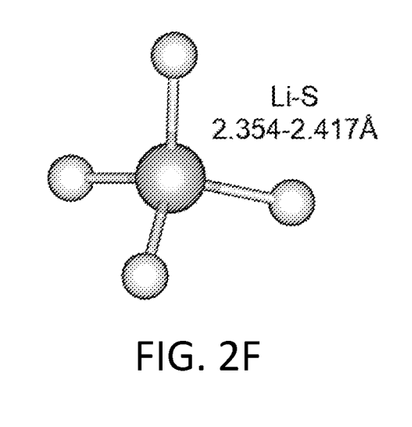
Figure 3A:
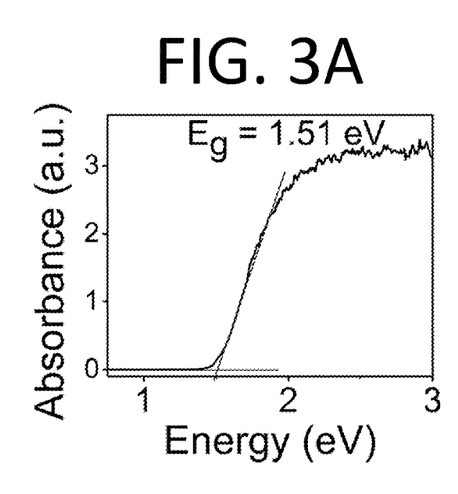
FIGS. 3A-3F show UV-Vis Absorbance spectra (derived via Kubelka-Munk equation, $F(R)=(1-R)^2/2R$, from Diffuse reflectance measurements) of (FIG. 3A) $Li_{1.66}CuSn_3S_8$, (FIG. 3B) $Li_2MnSn_3S_8$, (FIG. 3C) $Li_2CoSn_3S_8$, (FIG. 3D) $Li_2FeSn_3S_8$, (FIG. 3E) $Li_2MgSn_3S_8$, and (FIG. 3F) $Li_2NiSn_3S_8$. Straight lines are included to show the baseline and linear extrapolation used to determine the band gap.
Figure 3B:
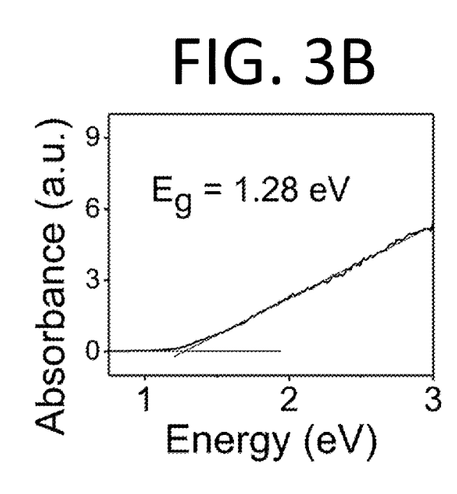
Figure 3C:
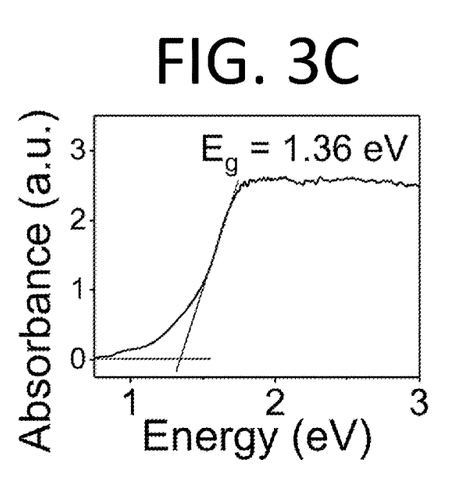
Figure 3D:
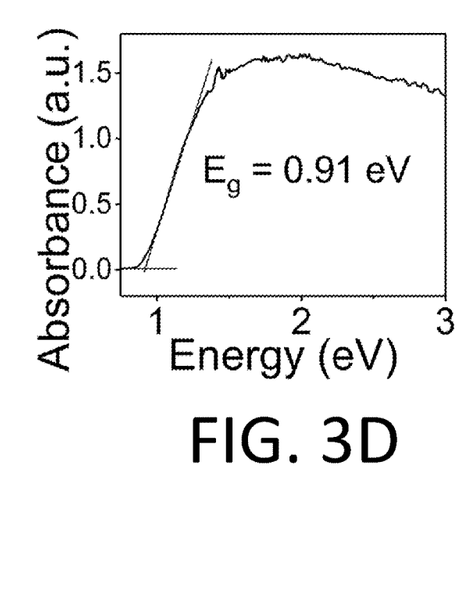
Figure 3E:
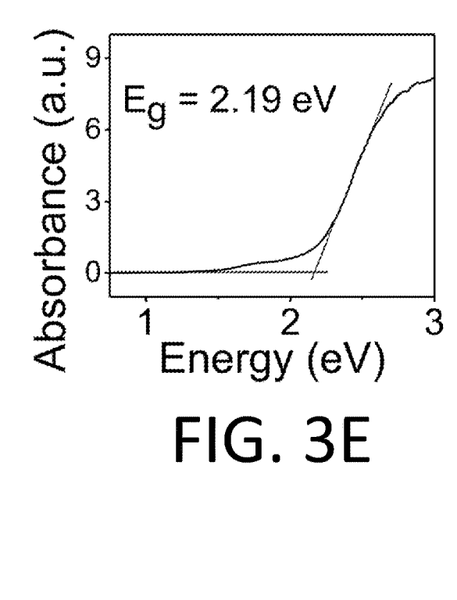
Figure 3F:
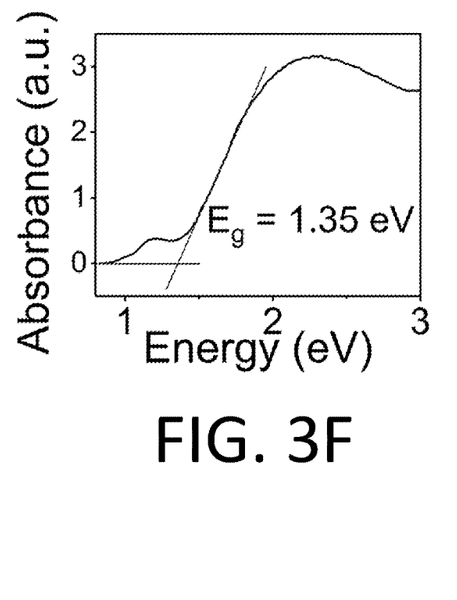
Figure 4A:
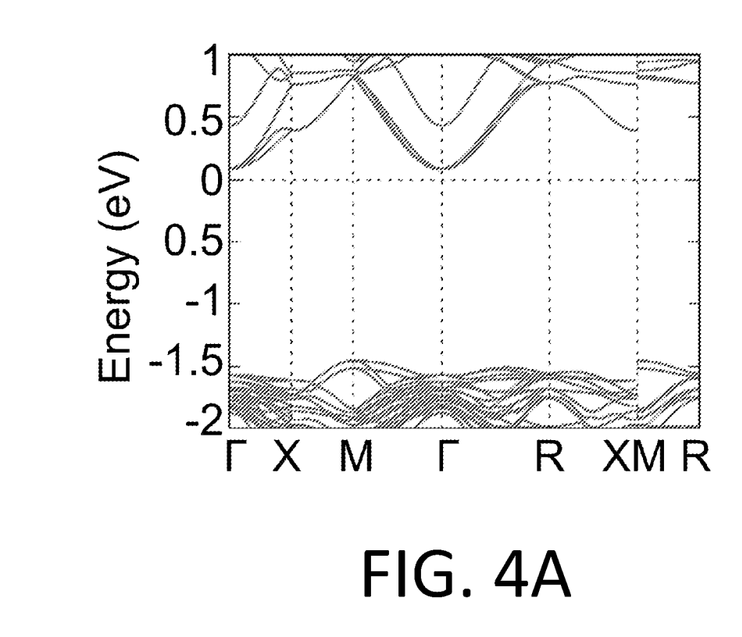
FIGS. 4A-4D show electronic band structure of (FIG. 4A) $Li_2MgSn_3S_8$ and (FIG. 4B) $Li_{1.66}CuSn_3S_8$ with calculated projected density of states (PDOS) (FIG. 4C) and (FIG. 4D), respectively.
Figure 4B:
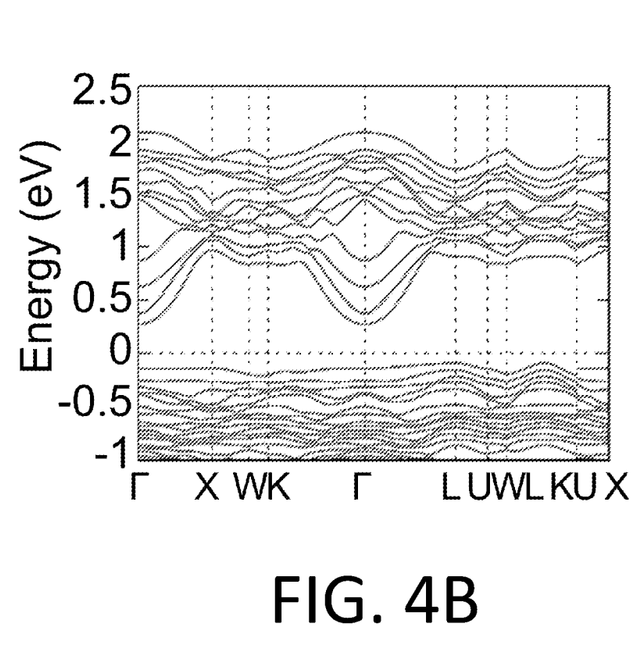
Figure 4C:
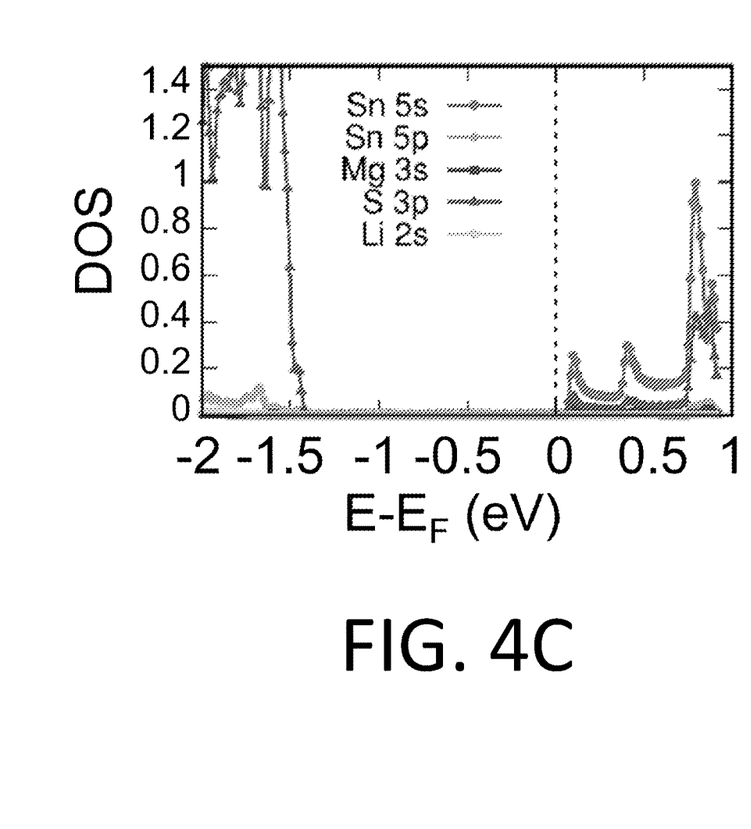
Figure 4D:
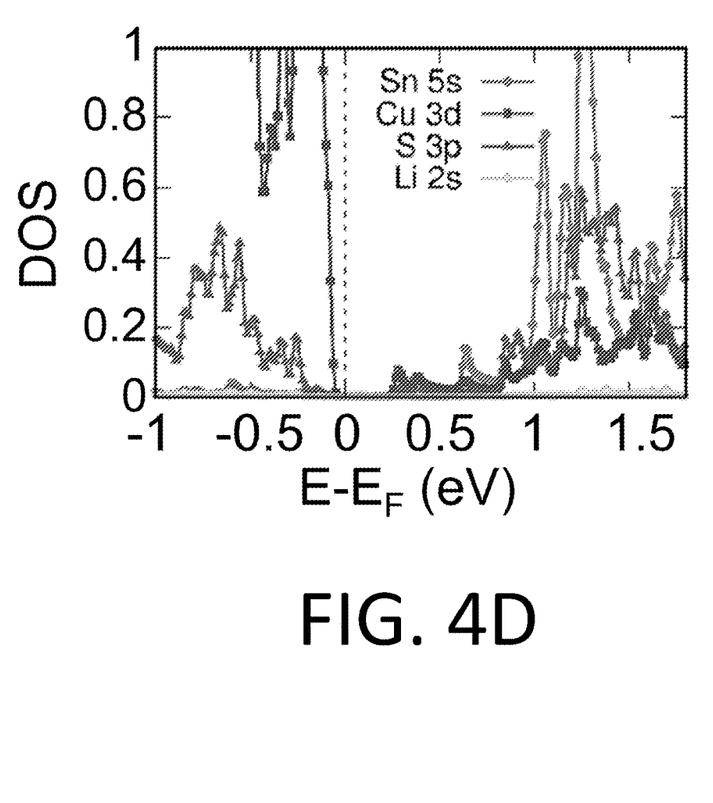

All the compounds crystallize in the spinel structure with the cubic space group Fd-3m, with the general formula $AB_2S_4$, (see Tables 1 and 2), wherein A represents Li, and B represents the transition metal and the tin. The compounds have the chemical formulas $Li_2MSn_3S_8$ (M=Mg, Fe, Mn, Ni, Co) or $Li_{1.66}CuSn_{3.33}S_8$. Energy dispersive X-ray spectroscopy (EDS) data (see Supplemental Information) show approximate agreement with the crystallographically refined compositions. Their structure can be described as a face-centered cubic (FCC) lattice of S anions, where the B cations are octahedrally coordinated by S anions occupying half of the octahedral sites, see FIG. 2E, and the A cations are tetrahedrally coordinated by S anions occupying an eighth of the tetrahedral sites, see FIG. 2F. The Li occupies the A site with Li—S bond lengths ranging from 2.373 (3) to 2.407 (2) Å, as shown in Table 1. In compounds where M=Mg, Fe, Mn, Ni, and Co, Sn and M occupy the same B sites and are present in a 3:1 ratio, as shown in FIGS. 2A-2C. In the Cu analogue, site occupancy disorder is observed at both the A and B sites, with Li and Cu having a ratio of 1:1 on the A sites and Li and Sn having a ratio of ~1:5 on the B sites, as shown in FIG. 2D.

TABLE 1

Crystal Data and Structure Refinement Details for $Li_2MSn_3S_8$ (M = Co, Mg, Fe)

| | | | |
|---|---|---|---|
| Empirical formula | Li2 Co Sn3 S8 | Li2 Mg Sn3 S8 | Li2 Fe Sn3 S8 |
| Formula weight | 685.14 | 650.84 | 682.06 |
| Temperature | 293(2) K | 293(2) K | 293(2) K |
| Wavelength | 0.71073 Å | 0.71073 Å | 0.71073 Å |
| Crystal system | Cubic | Cubic | Cubic |
| Space group | Fd-3m | Fd-3m | Fd3-m |
| Unit cell dimensions | a = 10.4683(12) Å, α = 90° b = 10.4683(12) Å, β = 90° c = 10.4683(12) Å, γ = 90° | a = 10.5720(12) Å, α = 90° b = 10.5720(12) Å, β = 90° c = 10.5720(12) Å, γ = 90° | a = 10.4971(12) Å, α = 90° b = 10.4971(12) Å, β = 90° c = 10.4971(12) Å, γ = 90° |
| Volume | 1147.2(4) Å$^3$ | 1181.6(4) Å$^3$ | 1156.7(4) Å$^3$ |
| Z | 4 | 4 | 4 |
| Density (calculated) | 3.968 g/cm$^3$ | 3.658 g/cm$^3$ | 3.918 g/cm$^3$ |
| Absorption coefficient | 9.275 mm$^{-1}$ | 7.703 mm$^{-1}$ | 9.019 mm$^{-1}$ |
| F(000) | 1244 | 1184 | 1240 |
| Crystal size | 0.2 × 0.3 × 0.2 mm$^3$ | 0.5 × 0.3 × 0.4 mm$^3$ | 0.3 × 0.2 × 0.4 mm$^3$ |
| θ range for data collection | 3.371 to 29.928° | 3.338 to 27.365° | 3.362 to 34.716° |
| Index ranges | −14 <= h <= 14, −14 <= k <= 14, −14 <= l <= 13 | −13 <= h <= 13, −13 <= k <= 13, −13 <= l <= 13 | −16 <= h <= 16, −16 <= k <= 15, −16 <= l <= 16 |
| Reflections collected | 2757 | 2282 | 4085 |
| Independent reflections | 104 [$R_{int}$ = 0.0878] | 87 [$R_{int}$ = 0.0571] | 148 [$R_{int}$ = 0.0351] |
| Completeness to θ = 25.242° | 98.6% | 100% | 98.6% |
| Refinement method | Full-matrix least-squares on F$^2$ | Full-matrix least-squares on F$^2$ | Full-matrix least-squares on F$^2$ |
| Data/restraints/parameters | 104/6/7 | 87/0/8 | 148/0/7 |
| Goodness-of-fit | 1.129 | 1.456 | 1.305 |
| Final R indices [I > 2σ(I)] | $R_{obs}$ = 0.0358, w$R_{obs}$ = 0.0834 | $R_{obs}$ = 0.0329, w$R_{obs}$ = 0.0762 | $R_{obs}$ = 0.0308, w$R_{obs}$ = 0.0791 |
| R indices [all data] | $R_{all}$ = 0.0390, w$R_{all}$ = 0.0870 | $R_{all}$ = 0.0396, w$R_{all}$ = 0.0780 | $R_{all}$ = 0.0345, w$R_{all}$ = 0.0811 |
| Extinction coefficient | N/A | 0.0017(3) | N/A |
| Largest diff. peak and hole | 0.803 and −1.830 e · Å$^{-3}$ | 1.170 and −0.755 e · Å$^{-3}$ | 0.724 and −2.483 e · Å$^{-3}$ |

$R = \Sigma||Fo| - |Fc||/\Sigma|Fo|$, $wR = \{\Sigma[w(|Fo|2 - [Fc|2)2]/\Sigma[w(|Fo|4)]\}^{1/2}$ and $w = 1/[\sigma2(Fo2) + (0.0154P)2 + 141.3500P]$ where $P = (Fo2 + 2Fc2)/3$

TABLE 2

Crystal Data and Structure Refinement Details for $Li_{1.66}CuSn_{3.33}S_8$ and $Li_2MSn_3S_8$ (M = Mn, Ni)

| | | | |
|---|---|---|---|
| Empirical formula | Cu Li1.67 Sn3.33 S8 | Li2 Mn Sn3 S8 | Li2 Ni Sn3 S8 |
| Formula weight | 726.62 | 681.15 | 684.59 |
| Temperature | 293(2) K | 293(2) K | 300.15 K |
| Wavelength | 0.71073 Å | 0.71073 Å | 0.71073 Å |
| Crystal system | Cubic | Cubic | Cubic |
| Space group | Fd-3m | Fd-3m | Fd-3m |
| Unit cell dimensions | a = 10.4920(12) Å, α = 90° b = 10.4920(12) Å, β = 90° c = 10.4920(12) Å, γ = 90° | a = 10.5233(12) Å, α = 90° b = 10.5233(12) Å, β = 90° c = 10.5233(12) Å, γ = 90° | a = 10.4750(12) Å, α = 90° b = 10.4750(12) Å, β = 90° c = 10.4750(12) Å, γ = 90° |
| Volume | 1155.0(4) Å$^3$ | 1183.9(4) Å$^3$ | 1149.4(4) Å$^3$ |
| Z | 4 | 4 | 4 |
| Density (calculated) | 4.180 g/cm$^3$ | 3.823 g/cm$^3$ | 3.959 g/cm$^3$ |
| Absorption coefficient | 10.316 mm$^{-1}$ | 8.791 mm$^{-1}$ | 9.452 mm$^{-1}$ |
| F(000) | 1314 | 1236 | 1248 |
| Crystal size | 0.5 × 0.5 × 0.3 mm$^3$ | 0.4 × 0.3 × 0.4 mm$^3$ | 0.3 × 0.4 × 0.5 mm$^3$ |
| θ range for data collection | 3.363 to 28.931° | 3.353 to 28.837° | 3.369 to 29.907° |
| Index ranges | −14 <= h <= 14, −14 <= k <= 14, −14 <= l <= 14 | −14 <= h <= 14, −12 <= k <= 14, −14 <= l = 14 | −14 <= h <= 11, −14 <= k <= 14, −14 <= l <= 14 |
| Reflections collected | 2560 | 2605 | 3471 |
| Independent reflections | 95 [$R_{int}$ = 0.0209] | 98 [$R_{int}$ = 0.0909] | 104 [$R_{int}$ = 0.0422] |
| Completeness to θ = 25.242° | 95.7% | 100% | 98.6% |
| Refinement method | Full-matrix least-squares on F$^2$ | Full-matrix least-squares on F$^2$ | Full-matrix least-squares on F$^2$ |
| Data/restraints/parameters | 95/0/8 | 98/0/7 | 104/0/7 |
| Goodness-of-fit | 1.153 | 1.192 | 1.243 |
| Final R indices [I > 2σ(I)] | $R_{obs}$ = 0.0430, $wR_{obs}$ = 0.0942 | $R_{obs}$ = 0.0463, $wR_{obs}$ = 0.1198 | $R_{obs}$ = 0.0487, $wR_{obs}$ = 0.1085 |
| R indices [all data] | $R_{all}$ = 0.0441, $wR_{all}$ = 0.0949 | $R_{all}$ = 0.0481, $wR_{all}$ = 0.1220 | $R_{all}$ = 0.0494, $wR_{all}$ = 0.1089 |
| Extinction coefficient | N/A | N/A | N/A |
| Largest diff. peak and hole | 3.089 and −2.197 e · Å$^{-3}$ | 1.086 and −2.483 e · Å$^{-3}$ | 6.177 and −0.982 e · Å$^{-3}$ |

R = Σ||Fo| − |Fc||/Σ|Fo|, wR = {Σ[w(|Fo|2 − |Fc|2)2]/Σ[w(|Fo|4)]}$^{1/2}$ and w = 1/[σ2(Fo2) + (0.0154P)2 + 141.3500P] where P = (Fo2 + 2Fc2)/3

The (Sn/M)-S bond lengths for all compounds were $A_x[M_xSn_{3-x}S_6]$ (M=Mn, Mg, In etc; A=Na, K, Rb, Cs), between 2.540(1) Å and 2.571(2) Å, see Table 3, which is close to the Sn—S bond length in $SnS_2$ of 2.56(2) Å. (Hazen, R. M. et al., *American Mineralogist* 1978, 63, (3-4), 289-292.) When the lattice parameters of the title thiospinel compounds were compared to those for $Cu_2MSn_3S_8$ (M=Mn, Fe, Co, Ni), it was observed that they were larger by 0.1966 Å for Ni and 0.1073 Å for Mn. (Lavela, P. et al., *Journal of Materials Chemistry* 1996, 6, (1), 41-47.) Although tetrahedrally coordinated Li$^+$ has nearly the same ionic radius, 0.590 Å, as Cu$^+$, 0.60 Å, the difference in size can be attributed to the covalent Cu—S bond being shorter/stronger than the ionic Li—S bond. (Shannon, R. D., *Acta crystallographica section A: crystal physics, diffraction, theoretical and general crystallography* 1976, 32, (5), 751-767.) The silver analogs, $Ag_2MSn_3S_8$ (M=Fe, Mn), have larger unit cells than the Li compounds at 10.6984 Å for Fe and 10.5723 Å for Mn, which is consistent with the much larger size of Ag$^+$ (1.00 Å) compared to Li$^+$. (Garg, G. et al., *Journal of Solid State Chemistry* 2003, 174, (1), 229-232; and Garg, G. et al., *Solid state ionics* 2003, 164, (3-4), 205-209.)

TABLE 3

Selected bond lengths for $Li_2MSn_3S_8$ (M = Mg, Fe, Mn, Ni, Co; x = 0, 1) and $Li_{1.66}CuSn_{3.33}S_8$.

| Bond | $Li_2FeSn_3S_8$ | $Li_2CoSn_3S_8$ | $Li_2MnSn_3S_8$ | $Li_2NiSn_3S_8$ | $Li_2MgSn_3S_8$ | $Li_{1.66}CuSn_{3.33}S_8$ |
|---|---|---|---|---|---|---|
| Sn/M—S (Å) | 2.5487(9) | 2.545(1) | 2.567(2) | 2.548(2) | 2.571(2) | 2.566(2) |
| Li—S (Å) | 2.407(2) | 2.395(2) | 2.393(3) | 2.393(3) | 2.417(4) | 2.373(3) |

The chemical stability of the compounds under ambient laboratory conditions and in direct contact with $H_2O$ was excellent over a period of several weeks, showing no observable changes in their powder X-ray diffraction patterns. More surprising is that powders submerged in water for ~12 h and then reanalyzed via powder x-ray diffraction (PXRD) showed no change. This is a remarkable result, as lithium chalcogenides are generally quite moisture-sensitive mainly because of the strong hydration of lithium ions. The exceptional stability observed here is due to the fact that the lithium ions were well protected from hydration by the 3D spinel structure.

The fact that the layered structure of the $A_x[M_xSn_{3-x}S_6]$ (M=Mg, Mn) KMS compounds was not observed when A=Li can be rationalized by the so-called counter-ion effect. Due to this effect, an increase in the dimensionality of an anionic framework occurs when the size of the counter-cations becomes small enough for it to happen. The KMS family adopts an intercalated $CdI_2$-type structure with $SnS_2$-type $[M_xSn_{3-x}S_6]$ layers of edge-sharing $(Sn/M)S_6^{2-}$ octahedral, which is charge-balanced by $A^+$ cations. These results show that lithium analogs of these materials adopt spinel structures as the most stable form described above. This 2D to 3D transition can be understood as a chemical pressure exerted on the layered framework when Li is used, which forces the structure to seek a smaller overall volume, thus causing linking across the third direction. In the present system, as the ionic radius of $Li^+$ (0.76 Å) is smaller than that of $Na^+$, 1.02 Å, and $K^+$, 1.38 Å, it can bring the $[MSn_2S_6]$ layers closer together. If this chemical pressure causes the $[MSn_2S_6]$ layers to come too close to each other, this could result in the adoption of a more stable arrangement with a smaller overall volume.

Optical Properties and Electronic Structure Calculations

The materials showed behavior typical of semiconductors, and the band gaps of $Li_2MgSn_3S_8$, $Li_{1.66}CuSn_{3.33}S_8$, $Li_2MnSn_3S_8$, $Li_2CoSn_3S_8$, $Li_2FeSn_3S_8$, and $Li_2NiSn_3S_8$ were measured using UV-Vis diffuse reflectance spectroscopy, see FIGS. 3A-3F. The observed band gaps were 2.19(2) eV, 1.50(2) eV, 1.28(2) eV, 1.36(2) eV, 0.91(2) eV, and 1.35(2) eV respectively. The large band gap of $Li_2MgSn_3S_8$ relative to the other analogs can be explained based on the fact that Mg is less electronegative than Fe, Cu, Mn, Co, and Ni, which makes the Mg—S bond more ionic in nature than the other metal-S bonds. This increased ionicity results in larger energy differences between filled $S^{2-}$ based orbitals in the valence bands and empty $Mg^{2+}$ s and p orbitals in the conduction bands. The small band gap of $Li_2FeSn_3S_8$ can be explained by observing that the electronegativity of Fe is much closer to that of elemental S than those of Mg and V, and comparable to that of Cu, Mn, and Co. This larger electronegativity, in turn, makes the Fe—S bond more covalent in nature than the Mg—S bond. The higher covalency in this bond leads to smaller energy differences between the filled $S^{-2}$ orbitals in the valence band and the empty $Fe^{2+}$ orbitals in the conduction band.

The calculated band structures seen in FIGS. 4A-4D predict indirect band gaps for both the Mg and Cu compounds with the valance band maxima occurring at the M point for $Li_2MgSn_3S_8$ and the L point for $Li_{1.66}CuSn_{3.33}S_8$ and the conduction band minima occurring at the Γ point for both. The calculations predict band gaps of ~1.50 eV and ~0.35 eV for these compounds, respectively, as shown in FIGS. 4A-4D. These numbers are far lower than the experimental values of 2.40(2) eV and 1.50(2) eV, respectively, owing to the well-known difficulty of accurately estimating band gaps using DFT. (Zunger, A., Beware of plausible predictions of fantasy materials. In Nature Publishing Group: 2019; pp 447-449.)

Although the valence to conduction band electronic transitions are predicted to be indirect, the experimental absorption edges for both compounds appeared relatively sharp. The sharp increase in the absorption edge can be rationalized by the presence of direct band gap transitions at the Γ point within a very small energy interval from the proper indirect bandgap. In $Li_2MgSn_3S_8$, for example, the energy difference in the valence band between the Γ and M point was <0.1 eV, whereas in $Li_{1.6}CuSn_{3.33}S_8$, the energy difference between the r point and the L point was even lower at <0.05 eV. The small energy differences between the direct and indirect transitions in each compound imply that the sharpness of the experimental absorption edges was likely due to the observation of direct Γ→Γ transitions in both compounds. In fact, these small energy differences suggested by the DFT calculation results (typically done at 0 K) essentially diminished near room temperature owing to thermally induced band broadening.

The energy dispersity in the conduction band for $Li_2MgSn_3S_8$ was considerable, being ~0.75 eV along the Γ→M direction, ~0.75 eV along the Γ→R, and ~0.4 eV along Γ→X. Similarly, $Li_{1.66}CuSn_{3.33}S_8$ exhibited high dispersity around its Γ point, though it was lower than that observed in $Li_2MgSn_3S_8$; the dispersity in the Γ→K and Γ→L directions were both ~0.6 eV with the dispersity in the Γ→X direction being ~0.7 eV. The broad conduction band widths of both compounds were reflected by the small calculated electron effective masses in each compound, with $Li_2MgSn_3S_8$ having a value of 0.49 $m_e$ and $Li_{1.66}CuSn_{3.33}S_8$ of 0.55 $m_e$. The predicted hole effective masses, however, were heavier at 1.25. and 1.75 $m_e$, respectively, because of the lower bandwidth dispersity in their valence bands.

Electrical Resistivity and Impedance Spectroscopy

The electrical resistivities of all the compounds fell between $2.38 \times 10^3$ Ω·cm and $2.9 \times 10^7$ Ω·cm, as shown in Table 4. The most resistive compound was $Li_2MgSn_3S_8$ due to its larger band gap. $Li_2NiSn_3S_8$, $Li_2MnSn_3S_8$, and $Li_{1.66}CuSn_{3.33}S_8$ all had resistivities on the order of $10^6$ Ω·cm and followed the trend of decreasing band gap as they are ordered from smallest to largest. The two most conductive compounds were $Li_2CoSn_3S_8$ and $Li_2FeSn_3S_8$, with resistivities of $3.47 \times 10^4$ Ω·cm and $2.8 \times 10^3$ Ω·cm, respectively.

TABLE 4

DC Electrical Resistivities and Room Temperature Li-ion conductivities for $Li_2MSn_3S_8$ (M = Mg, Fe, Mn, Ni, Co) and $Li_{1.66}CuSn_{3.33}S_8$.

| | $Li_2FeSn_3S_8$ | $Li_2CoSn_3S_8$ | $Li_2MnSn_3S_8$ | $Li_2NiSn_3S_8$ | $Li_2MgSn_3S_8$ | $Li_{1.66}CuSn_{3.33}S_8$ |
|---|---|---|---|---|---|---|
| Ω cm | $2.8 \times 10^3$ | $1.65 \times 10^4$ | $3.47 \times 10^6$ | $7.48 \times 10^6$ | $2.19 \times 10^7$ | $1.06 \times 10^6$ |
| mS cm$^{-1}$ | $1.9 \times 10^{-1}$ | 1.11 | $1.94 \times 10^{-4}$ | $1.93 \times 10^{-3}$ | $1.26 \times 10^{-4}$ | $2.55 \times 10^{-6}$ |

Figure 5A:
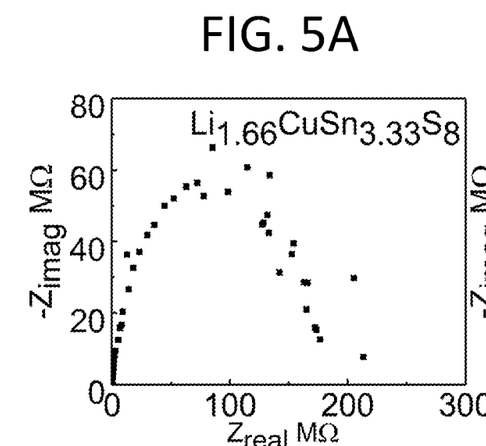
FIGS. 5A-5F show room-temperature AC electrochemical impedance spectra of sintered pellets of (FIG. 5A) $Li_{1.66}CuSn_{3.33}S_8$, (FIG. 5B) $Li_2MnSn_3S_8$, (FIG. 5C) $Li_2CoSn_3S_8$, (FIG. 5D) $Li_2MgSn_3S_8$, (FIG. 5E) $Li_2FeSn_3S_8$, and (FIG. 5F) $Li_2NiSn_3S_8$.
Figure 5B:
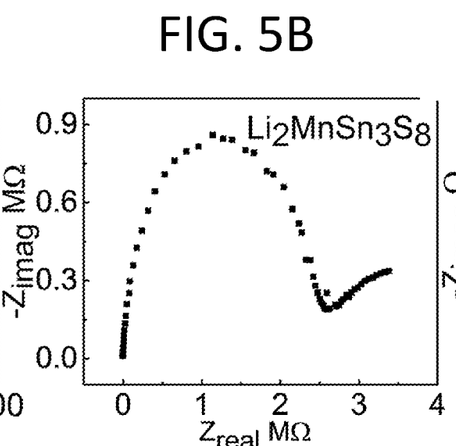
Figure 5C:
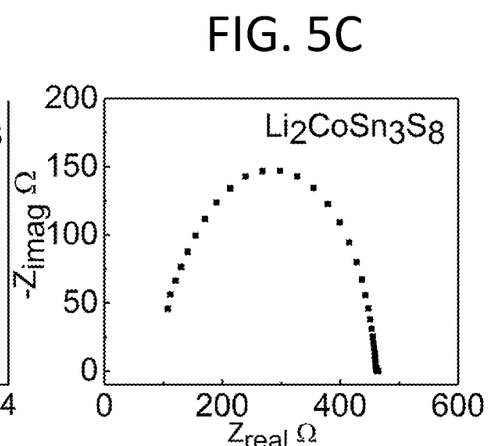
Figure 5D:
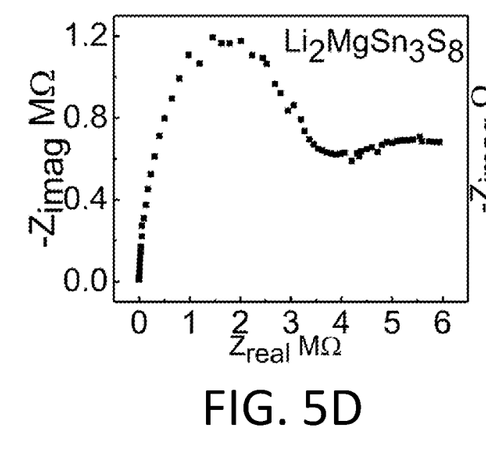
Figure 5E:
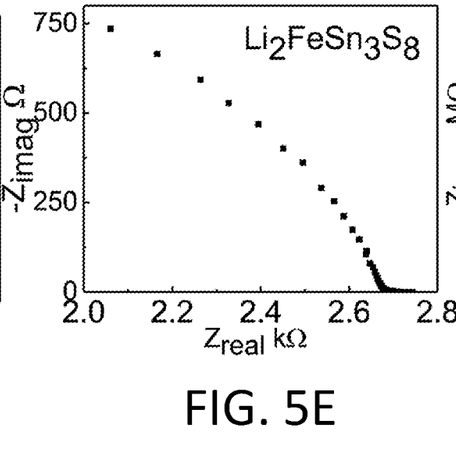
Figure 5F:
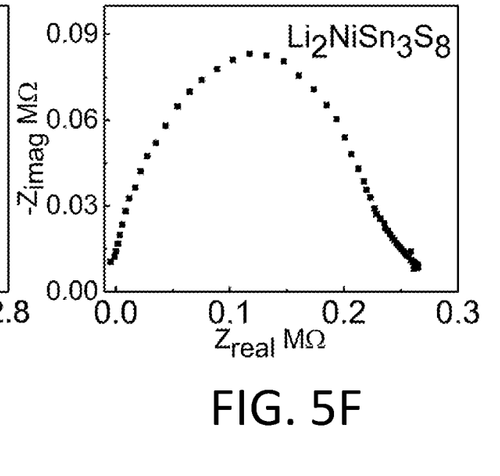

The conductivities determined using AC impedance spectroscopy for $Li_2FeSn_3S_8$ and $Li_2CoSn_3S_8$, $1.9\times10^{-4}$ S–$cm^{-1}$, and $1.11\times10^{-3}$ S–$cm^{-1}$, respectively, were notably high and most likely captured contributions from electronic conduction, see FIGS. 5E and 5C. The Li-ion conductivities of $Li_2MgSn_3S_8$, $Li_2MnSn_3S_8$, $Li_2NiSn_3S_8$, and $Li_{1.66}CuSn_{3.33}S_8$, FIGS. 5A, 5B, 5D, and 5F, were determined to be $1.26\times10^{-7}$, $1.94\times10^{-7}$, $1.93\times10^{-6}$, and $2.55\times10^{-9}$ S–$cm^{-1}$, respectively. The low Li-ion conductivities, suggesting limited probability of Li migration, were consistent with the apparent moisture resistance of the compounds, as the $Li^+$ ions were well coordinated in the lattice and so could not migrate. This lack of mobility limited the rate of decomposition of this family of compounds.

Supplemental Information
Additional Experimental Details

Powder X-ray Diffraction. Powder X-ray diffraction (PXRD) patterns were taken using a Rigaku Miniflex powder X-ray diffractometer with Ni-filtered Cu Kα radiation ($\lambda=1.5406$ Å) with a 30 kV voltage and 15 mA current. The diffraction pattern had a scan width of 0.02° and a scan rate of 10°/min. Simulated PXRD patterns were created using the software Mercury. (STOE & Cie, X-area (version 1.18) and X-red32 (version 1.04). 2002.)

Single Crystal X-ray Diffraction. A STOE IPDS 2T single crystal X-ray diffractometer, running at 50 kV and 40 mA with Mo Kα radiation ($\lambda=0.71073$ Å), was used to gather data on the crystal structures of compounds $Li_2MSn_3S_8$ (M=Mg, Co, Fe, Mn) and $Li_{1.66}CuSn_{3.33}S_8$. A Bruker Kappa APEX II single crystal X-ray diffractometer with a IµS microfocus X-ray (Mo Kα radiation, $\lambda=0.71073$ Å) source and an APEX2 CCD detector was used to gather data on $Li_2NiSn_3S_8$. Single crystals of all compounds were adhered to a glass fiber with super glue, and all data were collected at room temperature. Integration and numerical absorption corrections were performed using the X-AREA, X-RED, and X-SHAPE programs. (STOE & Cie, 2002.) The structure solution for each compound was carried out in Olex2 using the intrinsic phasing method implement in ShelXT to solve the structure and ShelXL to refine the structure using the Least Squares method. (Dolomanov, O. V. et al., *Journal of Applied Crystallography* 2009, 42, (2), 339-341; Sheldrick, G. M., SHELXT-Integrated space-group and crystal-structure determination. *Acta Crystallographica Section A: Foundations and Advances* 2015, 71, (1), 3-8; and Sheldrick, G. M., Crystal structure refinement with SHELXL. *Acta Crystallographica Section C. Structural Chemistry* 2015, 71, (1), 3-8.)

Differential Thermal Analysis (DTA). Differential thermal analysis (DTA) was performed using a Netzsch STA 449 F3 Jupiter simultaneous thermal analysis (STA) instrument. The samples were ground to a fine powder, loaded into carbon-coated silica ampules (approximately 30 mg in each ampule), and flame-sealed under vacuum. Each sample was compared to a sealed silica ampule containing aluminum oxide ($Al_2O_3$) of comparable mass. Each sample was heated to 1000° C. at a rate of 10° C./min, held at 1000° C. for 5 min, and cooled back down at a rate of 10° C./min. Each sample went through two cycles to show that the behavior was repeatable. After DTA was performed, a PXRD of each compound was taken to determine if the same phase was recovered.

UV-vis Diffuse Reflectance. Optical diffuse reflectance measurements were performed at room temperature using a Shimadzu UV-3600 PC double-beam, double-monochromator spectrophotometer operating from 200 to 2500 nm. $BaSO_4$ was used as a non-absorbing reflectance reference. The generated reflectance data was transformed to absorbance via the Kubelka-Munk equation $\alpha/S=(1-R)2/2R$, where R is the reflectance and $\alpha$ and S are the absorption and scattering coefficients, respectively. (Kortüm, G. et al., *Angewandte Chemie* 1963, 75, (14), 653-661.) The absorption edge was estimated by extrapolation of the linear regions.

Scanning Electron Microscopy and Energy Dispersive Spectroscopy (EDS).

Images and quantitative analysis (apart from lithium) were performed with an FEI Quanta 650 ESEM scanning electron microscope that was equipped with an integrated Oxford AZtec EDS system. Lithium cannot be detected by EDS due to its low electron count, so the results do not have lithium in the atomic percentages. EDS was performed at 30 kV, a spot size of 3, and a 30-60 s acquisition time. The chemical compositions of each crystal were the result of averaged compositions from multiple single-point data collections.

Powder X-Ray Diffraction

Powder X-ray diffraction (PXRD) patterns were taken using a Rigaku Miniflex powder X-ray diffractometer with Ni-filtered Cu Kα radiation ($\lambda=1.5406$ Å) with a 30 kV voltage and 15 mA current. The diffraction pattern had a scan width of 0.02° and a scan rate of 10°/min. Simulated PXRD patterns were created using the software Mercury.

The reactants and stoichiometric quantities used to make the and other lithium-containing thiostannate spinels are provided in Tables 5 and 6.

TABLE 5

Stoichiometric amounts used for the syntheses of single crystals of $Li_2MSn_3S_8$ (M = Co, Mg, Fe, Mn, Ni) and $Li_{1.66}CuSn_{3.33}S_8$.

| Compound | $Li_2S$ (mmol) | M (mmol) | Sn (mmol) | S (mmol) |
| --- | --- | --- | --- | --- |
| $Li_2FeSn_3S_8$ | 0.440 (20.2 mg) | 0.441 (24.6 mg) | 1.319 (156.6 mg) | 3.08 (98.7 mg) |
| $Li_2CoSn_3S_8$ | 0.437 (20.1 mg) | 0.438 (25.8 mg) | 1.313 (155.9 mg) | 3.06 (98.2 mg) |
| $Li_2MnSn_3S_8$ | 0.440 (20.2 mg) | 0.441 (24.2 mg) | 1.321 (156.8 mg) | 3.08 (98.8 mg) |
| $Li_2NiSn_3S_8$ | 0.437 (20.1 mg) | 0.438 (25.7 mg) | 1.313 (155.9 mg) | 3.07 (98.3 mg) |
| $Li_2MgSn_3S_8$ | 0.768 (35.3 mg) | 0.769 (18.7 mg) | 2.304 (273.6 mg) | 5.376 (172.4 mg) |
| $Li_{1.66}CuSn_{3.33}S_8$ | 0.342 (15.7 mg) | 0.412 (26.2 mg) | 1.374 (163.1 mg) | 2.960 (94.9 mg) |

TABLE 6

Stoichiometric amounts used for the syntheses of powders of
$Li_2MSn_3S_8$ (M = Co, Mg, Fe, Mn, Ni) and $Li_{1.66}CuSn_{3.33}S_8$.

| Compound | $Li_2S$ (mmol) | M (mmol) | Sn (mmol) | S (mmol) |
|---|---|---|---|---|
| $Li_2FeSn_3S_8$ | 0.733 (33.7 mg) | 0.732 (40.9 mg) | 2.198 (260.9 mg) | 5.129 (164.5 mg) |
| $Li_2CoSn_3S_8$ | 0.729 (33.5 mg) | 0.730 (43.0 mg) | 2.189 (259.8 mg) | 5.104 (163.7 mg) |
| $Li_2MnSn_3S_8$ | 0.733 (33.7 mg) | 0.734 (40.3 mg) | 2.201 (261.3 mg) | 5.136 (164.7 mg) |
| $Li_2NiSn_3S_8$ | 0.729 (33.5 mg) | 0.729 (42.8 mg) | 2.189 (259.9 mg) | 5.108 (163.8 mg) |
| $Li_2MgSn_3S_8$ | 1.230 (56.5 mg) | 1.230 (29.9 mg) | 3.688 (437.8 mg) | 8.603 (275.9 mg) |
| $Li_{1.66}CuSn_{3.33}S_8$ | 0.570 (26.2 mg) | 0.688 (43.7 mg) | 2.290 (271.9 mg) | 4.931 (158.1 mg) |

The word "illustrative" is used herein to mean serving as an example, instance, or illustration. Any aspect or design described herein as "illustrative" is not necessarily to be construed as preferred or advantageous over other aspects or designs. Further, for the purposes of the above disclosure and unless otherwise specified, "a" or "an" can mean only one or can mean "one or more", embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A lithium-containing thiostannate compound having a three-dimensional cubic spinel structure and the formula: $Li_2M_{1+x}Sn_{3-x}S_8$, where $0 \leq x \leq 1$ and M is Mg, Fe, Mn, Ni, Ga, In or a combination thereof; or $Li_{1.66}CuSn_{3.33}S_8$.

2. The lithium-containing thiostannate compound of claim 1, wherein the Li in the lithium-containing thiostannate compound comprises $^6Li$.

3. The lithium-containing thiostannate compound of claim 1, wherein the compound is in the form of a single-crystal.

4. The lithium-containing thiostannate compound of claim 1, having the formula $Li_2MgSn_3S_8$.

5. The lithium-containing thiostannate compound of claim 1, having the formula $Li_2NiSn_3S_8$.

6. The lithium-containing thiostannate compound of claim 1, having the formula $Li_2MnSn_3S_8$.

7. The lithium-containing thiostannate compound of claim 1, having the formula $Li_{1.66}CuSn_{3.33}S_8$.

8. A neutron or alpha-particle detector comprising:
a material comprising a lithium-containing thiostannate compound having a three-dimensional cubic spinel structure and the formula: $Li_2M_{1+x}Sn_{3-x}S_8$, where x is 0 or 1 and M is Mg, Fe, Mn, Ni, Ga, In or a combination thereof, or $Li_{1.66}CuSn_{3.33}S_8$;
a first electrode in electrical communication with the material; and
a second electrode in electrical communication with the material, wherein the first and second electrodes are configured to apply an electric field across the material.

9. The detector of claim 8, wherein the Li in the lithium-containing thiostannate compound comprises $^6Li$.

10. The detector of claim 8, wherein the lithium-containing thiostannate compound has the formula $Li_2MgSn_3S_8$.

11. The detector of claim 8, wherein the lithium-containing thiostannate compound has the formula $Li_2NiSn_3S_8$.

12. The detector of claim 8, wherein the lithium-containing thiostannate compound has the formula $Li_2MnSn_3S_8$.

13. The detector of claim 8, wherein the lithium-containing thiostannate compound has the formula $Li_{1.66}CuSn_{3.33}S_8$.

14. The detector of claim 8, further comprising:
a readout circuit coupled to the electrodes for detecting electrical signals generated when a neutron or alpha particle interacts with the lithium-containing thiostannate compound; and
an imaging system coupled to the readout circuit for processing signals from the readout circuit and generating an image of a neutron-emitting object or alpha-particle-emitting object being imaged by the detector.

15. A method for detecting neutrons or alpha particles, the method comprising:
applying an electric field across a lithium-containing thiostannate compound having a three-dimensional cubic spinel structure and the formula: $Li_2M_{1+x}Sn_{3-x}S_8$, where x is 0 or 1 and M is Mg, Fe, Mn, Ni, Ga, In or a combination thereof; or $Li_{1.66}CuSn_{3.33}S_8$;
exposing the lithium-containing thiostannate compound to incident neutrons or alpha particles, wherein the lithium-containing thiostannate compound absorbs incident neutrons or alpha particles, resulting in the generation of an electrical signal; and
detecting the electrical signal.

16. The method of claim 15, wherein the Li comprises 6Li.

17. The method of claim 15, wherein the lithium-containing thiostannate compound has a DC electrical resistivity in the range from $1.0 \times 10^6$ $\Omega cm^{-1}$ to $2.5 \times 10^7$ $\Omega cm^{-1}$.

18. The method of claim 15, wherein the lithium-containing thiostannate compound has an optical bandgap in the range from 0.9 eV to 2.3 eV.

19. The method of claim 15, wherein the Li in the lithium-containing thiostannate compound comprises $^6Li$.

20. The method of claim 15, wherein the lithium-containing thiostannate compound is selected from $Li_2MgSn_3S_8$, $Li_2NiSn_3S_8$, $Li_2MnSn_3S_8$, and $Li_{1.66}CuSn_{3.33}S_8$.

* * * * *